W. P. LECKY.
EDUCATIONAL APPLIANCE.
APPLICATION FILED DEC. 11, 1919.
1,367,192.
Patented Feb. 1, 1921.
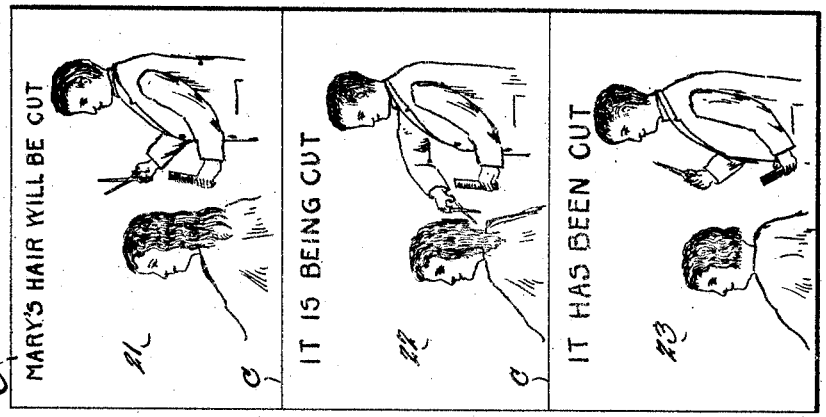
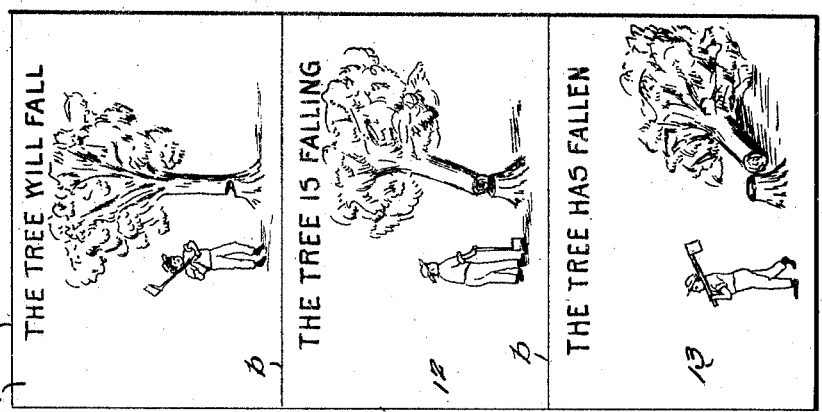
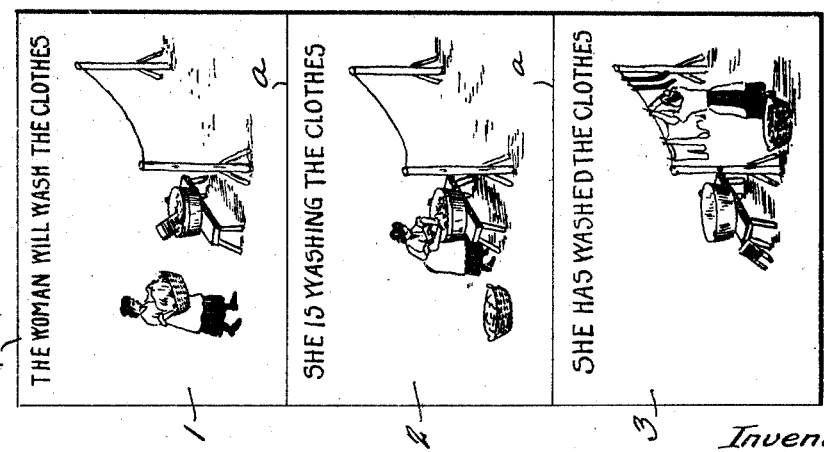
Witness
Inventor
William P. Lecky,
By G. H. Davis
Attorneys

UNITED STATES PATENT OFFICE.

WILLIAM PRESCOTT LECKY, OF RICHMOND, VIRGINIA.

EDUCATIONAL APPLIANCE.

1,367,192.   Specification of Letters Patent.   Patented Feb. 1, 1921.

Application filed December 11, 1919. Serial No. 344,185.

*To all whom it may concern:*

Be it known that I, WILLIAM PRESCOTT LECKY, a citizen of the United States of America, residing at Richmond, in the county of Henrico and State of Virginia, have invented certain new and useful Improvements in Educational Appliances, of which the following is a specification.

This invention relates to educational appliances, and more particularly to means for teaching the grammatical construction of languages.

The specific object of the invention is to devise a system for teaching the meaning of the different tenses of verbs, and to show the time relation of the actions which such tenses define.

To this end I propose to employ a series of pictures, printed on paper, card board, or the like, all showing the same objects, but the successive pictures illustrating these objects in progressively different relations or conditions. Each picture has associated therewith a phrase or sentence, printed or written on the paper or card, such phrases all containing the same verb, but employing different tenses thereof, to define the action illustrated by the corresponding pictures.

In order that the invention may be readily understood, reference is had to the accompanying drawings, forming part of this specification, and in which:—

Figs. 1, 2 and 3 represent sheets of paper or the like, each bearing pictures and printed matter arranged in accordance with my invention. Figs. 1 and 2 illustrate examples of transitive and intransitive verbs, respectively, in the active voice, while Fig. 3 shows a verb in passive voice.

Referring to the drawings in detail, Fig. 1 shows a sheet or card A divided by transverse lines *a* into three sections or panels, 1, 2 and 3. By way of illustrating an active transitive verb, I have selected the familiar scene of a woman engaged in washing clothes. The pictures include the representation of a clothes line, a wash tub, a basket of clothes, and a woman. In section 1, the woman is shown as approaching the tub, carrying the basket of clothes. It is obvious what action is contemplated or is about to occur. "The woman will wash the clothes" is a phrase which aptly states what the picture represents, and this phrase, containing a verb in the future tense, is printed or written on section 1, so as to be associated with the picture thereon.

Section 2 depicts the next step in the development of the idea, which step naturally follows the first. This step is the actual carrying out of the action contemplated in the preceding picture. To the question "What is the woman doing?", which might be propounded by the teacher, the answer readily suggests itself—"She is washing the clothes." This phrase, therefore, containing the verb in the present tense, is printed on section 2.

The third picture of the series shows the action suggested and illustrated, respectively, by the first two pictures, as having been entirely accomplished or completed. In section 3 the woman is depicted as in the act of hanging the clothes on the line. Therefore, "She has washed the clothes," and this phrase, containing the verb in the perfect tense, is associated with the third picture.

It will be noted that the tenses of the verbs are presented in this order,—future, present, and perfect; and I have determined that this is the natural and logical sequence. The mind of the student readily follows the succession of ideas from an action about to occur, to the action actually taking place, and then to the same action completed or finished; a time interval occurring between each stage of the action represented, and I have found that the meaning of the tenses is much more easily grasped in this way.

In Fig. 2, I have illustrated the same principle applied to an active intransitive verb. The figure shows a sheet B, divided by transverse lines *b* into panels or sections 11, 12 and 13. The first section depicts a man cutting a tree with an axe. The question naturally arises as to what will happen after the action has been continued for a certain time interval. The answer is "The tree will fall." This phrase therefore is used. In section 12, the tree is shown as in the act of falling, and the words "The tree is falling" are associated with the picture. After a brief time interval, the action is completed, and the third picture, on section 13, shows that "The tree has fallen."

In Fig. 3, I have shown an example of a verb in the passive voice. The sheet C is divided by transverse lines *c* into three panels or sections 21, 22 and 23, as in the preceding figures. The subject adopted is that of a girl having her hair cut. In the first section is seen the barber with comb and scissors in hand, about to begin the operation of cutting Mary's hair. With this picture is associated the phrase "Mary's hair will be cut." The second section shows the barber in the act of cutting the hair, and this section bears the phrase "It is being cut." The third section depicts the condition of the subject after the hair has been cut, that is, after the operation has been completed. Therefore, in connection with this picture appears the phrase "It has been cut."

It will be noted that in the last two sections in Figs. 1 and 3 the pronoun has been substituted for the noun, as subject of the sentence, while in Fig. 2 the noun is used throughout. I contemplate using either or both of these methods, as may appear desirable.

While in the illustrations given in the drawings, the third person singular has been employed, it will, of course, be understood that the third person plural, and the first and second person, singular or plural, can be handled in the same way.

While I have shown the three pictures of a series as printed on different panels or sections of the same sheet, it is, of course, obvious that I may, if preferred, form the pictures on separate sheets or cards.

It is apparent that the range and variety of subjects which can be treated is almost unlimited, and it will be seen that my invention affords a ready and logical means for teaching the principles of a language, and especially the time relation and meaning of the different tenses of verbs.

What I claim is:—

An improved means for teaching the tenses of verbs, the same consisting of a series of pictures all showing the same objects, the first picture of the series illustrating an action about to occur, the second representing such action as actually taking place, and the third illustrating such action as completed, and descriptive matter associated with each picture, said matter comprising a phrase containing a verb in the future tense for the first picture, a similar phrase containing the same verb in the present tense for the second picture, and a similar phrase containing the same verb in the perfect tense for the third picture.

In testimony whereof I have affixed my signature in presence of two witnesses.

WILLIAM PRESCOTT LECKY.

Witnesses:
ROBERT SCHARFER,
FRED L. NESBITT.